Dec. 18, 1928.

E. A. ROLLINS 1,695,295

TEMPERATURE INDICATOR

Filed July 11, 1923

Inventor.
Edward A. Rollins
by Heard Smith & Tennant.
Attys.

Patented Dec. 18, 1928.

1,695,295

UNITED STATES PATENT OFFICE.

EDWARD A. ROLLINS, OF ROXBURY, MASSACHUSETTS.

TEMPERATURE INDICATOR.

Application filed July 11, 1923. Serial No. 650,880.

This invention relates to a temperature indicator of the type which continuously indicates the temperature and any variations thereof.

It is old in the art of temperature indicators to provide a thermostatic element which moves under the influence of heat and either makes or breaks an electric circuit to light or extinguish a lamp which indicates that a certain temperature has been reached by the thermostatic element of the indicator. Such indicators, however, give no indications as to the actual temperature to which the thermostatic element is subjected, but only indicate that a certain definite predetermined temperature for which the apparatus is set either has or has not been reached. There is no means in connection with these indicators to indicate how far above the predetermined temperature is the actual temperature of the thermostatic element or how far below the setting is the actual temperature.

With the device of my invention, however, an indicator is provided which continuously indicates within a predetermined range the actual temperature to which the thermostatic element is subjected and which does not snap on or off within that range.

One of the features of the invention is that the signal member of the indicator is actuated to continuously indicate within a predetermined range the actual temperature to which the thermostatic element is subjected. In order to accomplish this I provide a thermostatic element with the movable member arranged to vary its position as the temperatures varies and a signal member co-operating with said movable member to indicate the position of said movable member thereby to indicate the temperature. Although various types of signal members may be used I prefer to make the signal member in the form of an electric lamp and place a single contact variable pressure rheostat in the circuit of the electric lamp in such a position that when the thermostatic element moves under the influence of the heat to which it is subjected, said thermostatic element actuates the movable member to change the resistance of the rheostat and thus change the brilliancy of the electric lamp thereby to indicate the temperature.

One of the objects of the present invention is to provide a temperature indicator which is adapted to be clamped against a container such as a pipe or flue through which heated fluids are passing and continuously indicate the temperature of the container.

A further and more particular object of the invention is to provide a temperature indicator for a gas engine which is adapted to be clamped against some portion of the gas engine and continuously indicate the temperature thereof by a change in the brilliancy of an indicating lamp which is controlled by a thermostatic element of the indicator.

Other objects and features of the invention will more fully appear from the following description and the accompanying drawings and will be particularly pointed out in the claims.

In order to give an understanding of the invention I have illustrated in the drawings a selected embodiment thereof which will now be described.

The drawings illustrate in section and elevation a preferred form of construction of a temperature indicator embodying the broad principles of the invention.

Figure 1:
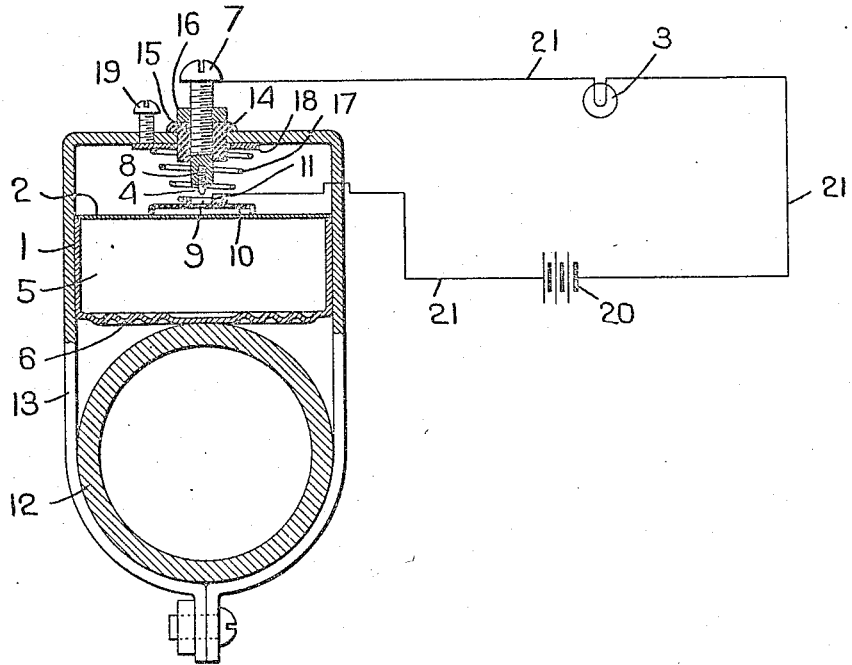
Fig. 1 is a section through a temperature indicator applied to a pipe the temperature of which is to be indicated, showing diagrammatically the electric circuit and the signal lamp which visibly indicates the temperature.
Figure 2:
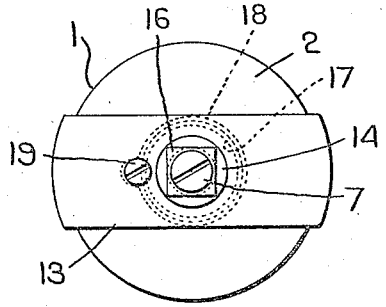
Fig. 2 is a plan view of the thermostatic member of the indicator shown in Fig. 1.

As illustrated herein the temperature indicator comprises a thermostatic member 1 having a movable portion 2 responsive to changes in temperature, a circuit having a signal member 3 therein and a variable pressure rheostat 4 in said circuit associated with said movable portion of the thermostatic member, whereby movement of said movable portion, due to temperature changes, causes a variation of the resistance of the rheostat and thereby a change in the signal member. While the invention is not limited to the use of any particular material for the variable pressure thermostat yet it is suggested that graphite makes a suitable material for this purpose as it provides for a single-contact variable pressure resistance. The signal member may be any device connected in any way to indicate a change in the resistance of the rheostat, but is preferably an electric lamp of appropriate size connected in series with the rheostat.

Although any type of thermostatic member may be used so long as it may abut a portion of the variable pressure rheostat and actuate the rheostat when the thermostatic member is subjected to the influence of heat, the thermostatic member has been shown as a closed fluid-containing chamber 5 one wall 2 of which constitutes the movable portion or diaphragm. The chamber is hermetically sealed and it is obvious that as the fluid in the chamber becomes heated and expands, the diaphragm 2 will be forced outwardly. Either gas or liquid may be used to fill the chamber and a fluid should be selected having regard for the temperatures at which the indicator is designed to operate. If the indicator is to be used to indicate the temperature of the cooling system of a gas engine, such as the engine of an automobile, it has been found that air is a fluid well suited to the range of temperatures to be indicated. It is obvious that the diaphragm must be made of some material which will move under the influence of the fluid. The walls and bottom 6 of the chamber should be of some material which readily conducts heat but which has little expansion under the influence of heat and which is strong enough to resist the expansion force of the heated fluid.

The rheostat is of the variable pressure type and is held adjacent the movable member or diaphragm 2 so that when the diaphragm moves under the influence of the expanding fluid the variable pressure on the rheostat changes its resistance. At present it is deemed preferable to make the rheostat in the form of a small rod of material which decreases its resistance according to contact pressure and to support such rod in a contact carrying member 7. The rheostat may be held in said member in any convenient manner and one such construction for accomplishing this purpose has been illustrated in the drawings. The contact carrying member is provided with a threaded recess 8 at its end and the rod of the contact resistance material is threaded and screwed into the threaded recess leaving an end of the material projecting beyond the member. The projecting end is shaped into a rather blunt point so that it makes a single point contact with a conducting plate 9 which is supported on the diaphragm for movement therewith. In order to insulate the plate from the diaphragm and thus from the remainder of the thermostat an insulating washer 10 is placed between the conducting plate and the diaphragm. This insulating washer is firmly secured to the diaphragm and has a projection 11 therefrom which keeps the conducting plate in its correct position below the point of the rheostat.

In order to permit the adjustment of the indicator and its setting to indicate temperatures within a certain range, the contact carrying member is preferably in the form of a screw which may be moved so that the rheostat does not contact with the conducting plate and thus does not complete the circuit to the electric lamp below a certain minimum temperature for which the indicator is set.

In order to retain the indicator in position on a pipe or flue 12, a yoke 13 engages the chamber and the pipe 12. In order to insulate the contact carrying member and rheostat from the yoke, an insulating bushing 14 is fastened in the yoke and is provided with a threaded opening 15 in which the contact carrying member is adjustably held. A lock nut 16 is preferably placed above the insulating bushing in order to retain the rheostat and contact actuating member in adjusted position.

In order to insure that the diaphragm will always return to its retracted position when the temperature has fallen, a spring 17 may be placed in such a position that it forces the diaphragm into its retracted position. The spring may be of any suitable form but is preferably a coiled spring which bears at one end against the insulating washer 10 outside of the projection 11 which thus serves to space the spring from the conducting plate and at the other end against the yoke. In order to adjust the tension on the spring a washer 18, preferably of insulating material, is inserted between the yoke and the top of the spring and an adjusting screw 19 is threaded into an opening in the yoke with one end contacting with said washer. By moving the screw 19 the washer may be forced away from the yoke and the spring 17 put under greater tension. In this manner the resistance to the movement of the diaphragm may be changed to take care of any variations in the operation of the indicator such as variations in pressure which may result from the use of different fluids in the chamber 5.

The circuit for the signal member includes a source of electricity such as a battery 20 connected by means of suitable wires 21 to the signal member and the rheostat and the conducting plate thereby to complete the electric circuit.

Although a particular and preferred form of the invention has been described it is obvious that modifications may be made and the invention is to be construed as broadly as the limitations in the claims, taken in conjunction with the prior art, may allow.

Having thus described the invention, what is claimed as new, and desired to be secured by Letters Patent, is:

1. A temperature indicator comprising a movable member arranged to vary its position as the temperature varies, a circuit having two contacts, one of which is carried by said movable member, and the other of which is stationarily mounted, said contacts being so relatively situated that at temperatures below a predetermined temperature they will be separated and the circuit will be opened, but at temperatures above said predetermined temperature they will be closed thus closing the circuit, one of said contacts being in the nature of a solid variable pressure rheostat, the resistance of which varies as the pressure thereon varies, whereby as the temperature rises the contacts will be pressed together with a varying pressure thereby to produce a corresponding change of resistance in the circuit.

2. A temperature indicator for gas engines, comprising a closed fluid-containing chamber, one wall of which constitutes a diaphragm, a contact carried by said diaphragm, a yoke engaging said chamber for holding the latter against a portion of the engine, an insulating bushing on the yoke, a contact-carrying member supported by the bushing, a single-contact variable pressure rheostat carried by the contact-carrying member for engaging with the contact on the diaphragm, a signal circuit including said contacts, said contacts being so relatively disposed that at temperatures below a predetermined temperature they are separated and the circuit is opened, while at temperatures above the predetermined temperatures they are closed thereby closing the circuit, the variable pressure rheostat contact causing a variation in the resistance of the circuit as the temperature varies while above said predetermined point.

In testimony whereof, I have signed my name to this specification.

EDWARD A. ROLLINS.